US010605896B2

(12) United States Patent
Cao et al.

(10) Patent No.: US 10,605,896 B2
(45) Date of Patent: Mar. 31, 2020

(54) RADAR-INSTALLATION-ANGLE CALCULATING DEVICE, RADAR APPARATUS, AND RADAR-INSTALLATION-ANGLE CALCULATING METHOD

(71) Applicant: Panasonic Intellectual Property Management Co., Ltd., Osaka (JP)

(72) Inventors: Yunyun Cao, Tokyo (JP); Hirofumi Nishimura, Kanagawa (JP); Asako Hamada, Kanagawa (JP); Hiroshi Iwamura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 441 days.

(21) Appl. No.: 15/647,726

(22) Filed: Jul. 12, 2017

(65) Prior Publication Data

US 2018/0045811 A1 Feb. 15, 2018

(30) Foreign Application Priority Data

Aug. 10, 2016 (JP) .................................. 2016-157951

(51) Int. Cl.
*G01S 7/40* (2006.01)
*G01S 13/50* (2006.01)
(Continued)

(52) U.S. Cl.
CPC .......... *G01S 7/4004* (2013.01); *G01S 7/4026* (2013.01); *G01S 13/50* (2013.01); *G01S 13/60* (2013.01);
(Continued)

(58) Field of Classification Search
CPC ................. G01S 13/931; G01S 7/4026; G01S 2013/9375; G01S 2007/403;
(Continued)

(56) References Cited

U.S. PATENT DOCUMENTS 5,977,906 A * 11/1999 Ameen ................. G01S 7/4026
342/165
6,714,156 B1 * 3/2004 Ibrahim ............... G01S 7/4026
342/165
(Continued)

FOREIGN PATENT DOCUMENTS

JP 2014-153256 A 8/2014

OTHER PUBLICATIONS

Extended European Search Report, dated Jan. 12, 2018, for the related European Patent Application No. 17182030.1-1206, 8 pages.

*Primary Examiner* — Olumide Ajibade Akonai
(74) *Attorney, Agent, or Firm* — Seed IP Law Group LLP

(57) ABSTRACT

A first data group, which indicates reflection wave intensities from reflection points for radar directions indicating directions in which the corresponding reflection points exist relative to a radar apparatus and distances from the radar apparatus to the reflection points, and a second data group, which indicates Doppler velocities of the reflection points for the radar directions and the distances from the radar apparatus to the reflection points, are used to generate a third data group, which indicates the reflection wave intensities of the reflection points. A radar moving direction relative to a moving direction of the vehicle for each frame is generated based on the third data group. The radar moving direction when the moving direction of the vehicle is straight ahead is estimated using the radar moving direction in a predetermined number of frames, and the radar installation angle is calculated using the estimated radar moving direction.

9 Claims, 11 Drawing Sheets

(51) Int. Cl.
*G01S 13/93* (2020.01)
*G01S 13/60* (2006.01)
*G01S 13/931* (2020.01)

(52) U.S. Cl.
CPC ....... *G01S 13/931* (2013.01); *G01S 2007/403* (2013.01); *G01S 2007/4091* (2013.01); *G01S 2013/9353* (2013.01); *G01S 2013/9385* (2013.01)

(58) Field of Classification Search
CPC ..... G01S 2013/9353; G01S 2013/9385; G01S 2013/9389; G01S 2007/4034; G01S 2007/4091; G01S 13/60; G01S 2013/9378; G01S 13/42; G01S 7/4972; G01S 13/58; G01S 7/4004
USPC .......................................................... 342/174
See application file for complete search history.

(56) References Cited

U.S. PATENT DOCUMENTS

| | | | |
|---|---|---|---|
| 2005/0024261 A1* | 2/2005 | Fujita | G01S 7/4026 342/174 |
| 2013/0162462 A1* | 6/2013 | Lehning | G01S 13/58 342/104 |
| 2015/0070207 A1 | 3/2015 | Millar et al. | |
| 2016/0011299 A1 | 1/2016 | Satou et al. | |
| 2016/0178742 A1 | 6/2016 | Shikatani et al. | |
| 2016/0223657 A1* | 8/2016 | Huntzicker | G07C 5/0808 |
| 2016/0291143 A1* | 10/2016 | Cao | G01S 13/931 |

\* cited by examiner

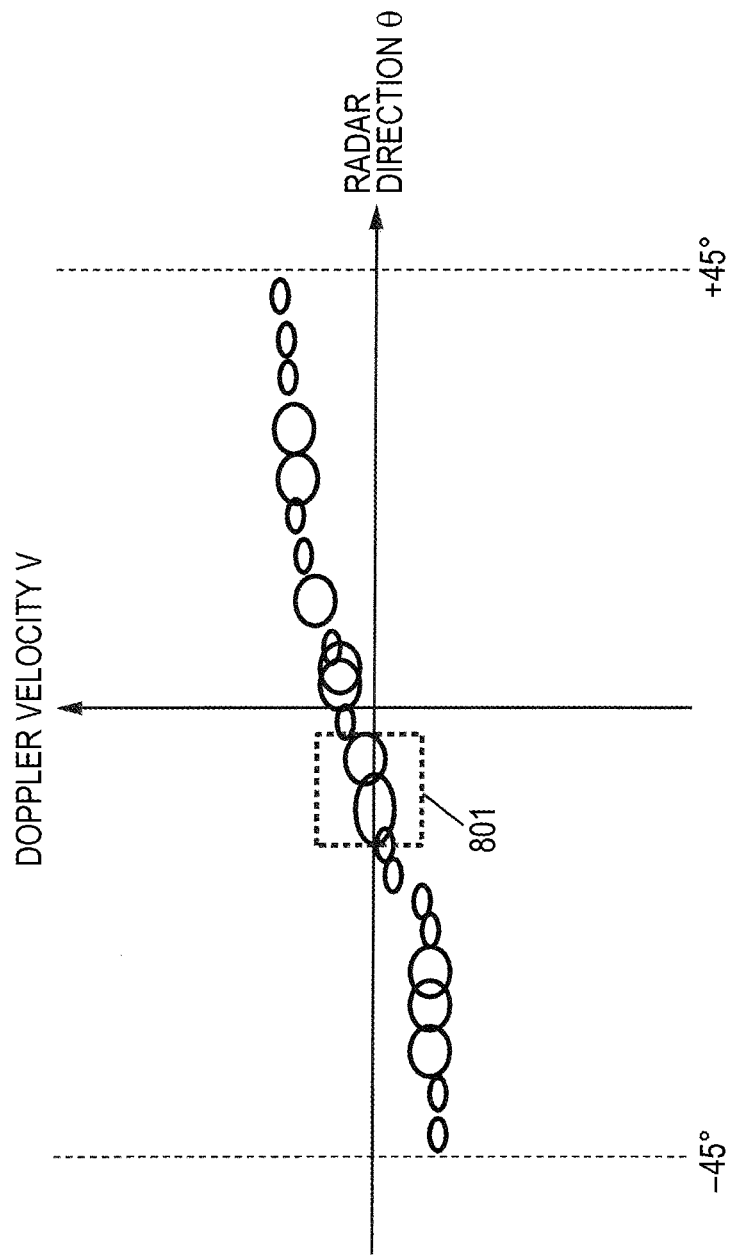

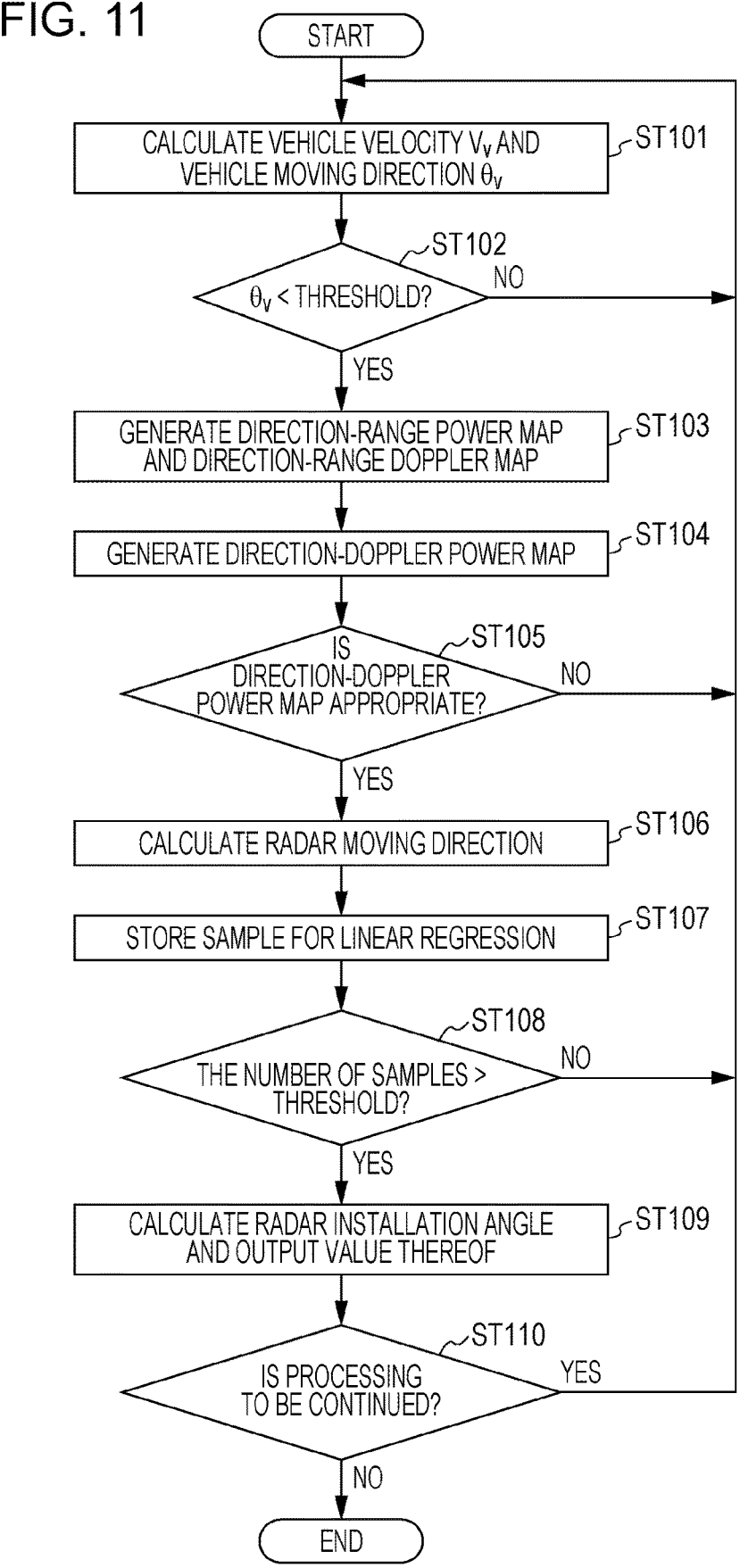

RADAR-INSTALLATION-ANGLE CALCULATING DEVICE, RADAR APPARATUS, AND RADAR-INSTALLATION-ANGLE CALCULATING METHOD

BACKGROUND

1. Technical Field

The present disclosure relates to a measurement radar-installation-angle calculating device mounted on a vehicle or the like to estimate a radar installation angle, a radar apparatus, and a radar-installation-angle calculating method.

2. Description of the Related Art

In recent years, technology in which a radar apparatus is mounted on a vehicle or the like to detect the presence of an objects (obstacle), such as a vehicle traveling ahead, a vehicle that is stopped, or a pedestrian, in surroundings to prevent a collision or contact with the detected obstacle has come into widespread use. Such a vehicle-mounted radar apparatus has a radar antenna installed at a pre-set predetermined installation angle and calculates the position, the velocity, and so on of an obstacle by using the value of the installation angle.

Thus, when the installation angle of the radar apparatus is axially displaced from a predetermined installation angle (which is, for example, pre-set at the time of factory shipment) for some cause (e.g., a loosen or broken installation jig), error may occur during detection of the position and the velocity of an obstacle, the obstacle may be falsely detected, or the detection of the obstacle may become difficult. Accordingly, there are demands for a radar apparatus that monitors the installation angle thereof to monitor whether or not axis displacement from a predetermined installation angle occurs.

For example, Japanese Unexamined Patent Application Publication No. 2014-153256 (hereinafter referred to as "Patent Document 1") discloses a technology in which, when a vehicle on which a radar apparatus is mounted is traveling straight ahead at velocity higher than or equal to a lower limit velocity, an observation point at which a relative velocity is zero is extracted from data about observation points, detected by a radar sensor, as being a wall-candidate observation point based on a reflection wave from a wall that exists in the direction of 90° from the vehicle, and the installation angle of the radar sensor is calculated using the direction of the wall-candidate observation point.

With the technology disclosed in Patent Document 1, however, it is difficult to calculate the installation angle of the radar sensor, except for a situation in which the vehicle is traveling straight ahead and a stationary object, such as a sound-insulating wall, exists beside the vehicle. Thus, with the technology disclosed in Patent Document 1, although the installation angle can be calculated under limited environments, such as on a highway, it is difficult to calculate the installation angle, for example, when the vehicle travels in various directions in addition to traveling straight ahead, as in an urban area or the like, when no wall surface exists beside the vehicle, or when the velocity of the vehicle is relatively low. Thus, there are demands for a technology that makes it possible to accurately calculate the installation angle of a radar apparatus regardless of an environment in which the vehicle is.

SUMMARY

One non-limiting and exemplary embodiment provides a radar-installation-angle calculating device, a radar apparatus, and a radar-installation-angle calculating method that make it possible to accurately calculate the installation angle of a radar apparatus regardless of an environment in which a vehicle is.

In one general aspect, the techniques disclosed here feature a radar-installation-angle calculating device for a radar apparatus mounted on a vehicle. The radar-installation-angle calculating device includes: radar data acquisition circuitry that generates a first data group and a second data group for each frame of a plurality of frames by using information regarding a velocity of the vehicle and a moving direction of the vehicle, the first data group indicating a plurality of reflection wave intensities from a plurality of reflection points with respect to radar directions and distances from the radar apparatus to the reflection points, the second data group indicating Doppler velocities of the reflection points with respect to the radar directions and the distances from the radar apparatus to the reflection points, and the radar directions indicating directions in which the corresponding reflection points exist relative to the radar apparatus; data selection circuitry that generates a third data group by using the first data group and the second data group, the third data group indicating the reflection wave intensities from the reflection points with respect to the radar directions and the Doppler velocities; radar movement estimation circuitry that calculates a radar moving direction for each of the plurality of frames, based on the third data group, the radar moving direction indicating a moving direction of the radar apparatus relative to the moving direction of the vehicle; and
calculation circuitry that estimates the radar moving direction in a state in which the moving direction of the vehicle is straight ahead, by using the radar moving direction relative to the moving direction of the vehicle in a determined number of frames of the plurality of frames, and that calculates the radar installation angle by using the estimated radar moving direction.

According to one aspect of the present disclosure, the installation angle of a radar apparatus can be accurately calculated, regardless of the environment in which a vehicle is.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 8 illustrates the direction-Doppler power map when the velocity of the vehicle is lower than a predetermined threshold;

FIG. 11 is a flowchart illustrating an example operation of the radar-installation-angle calculator.

DETAILED DESCRIPTION

A description will be given of a calculation method for the installation angle of a radar apparatus.

Figure 1:
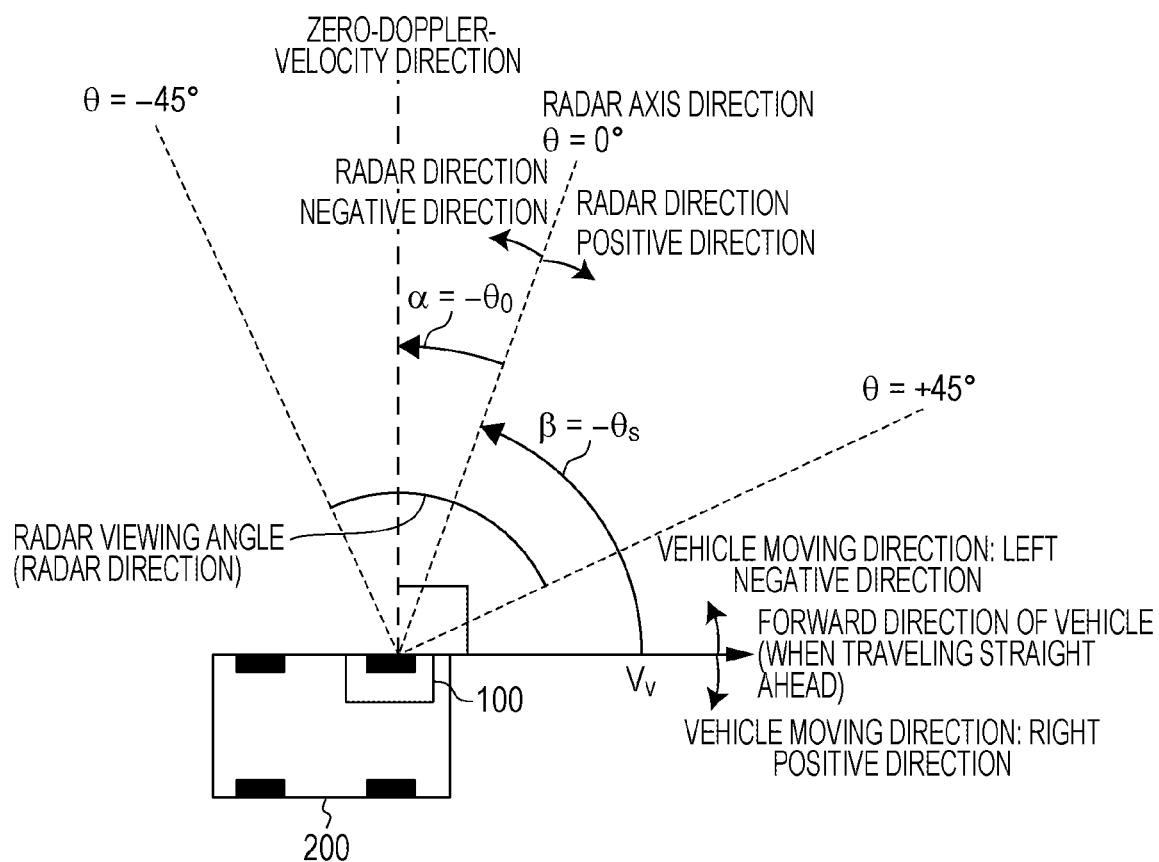
FIG. 1 is a diagram illustrating a calculation method for the installation angle of a radar apparatus.

FIG. 1 is a diagram illustrating a calculation method for the installation angle of a radar apparatus. In FIG. 1, a radar apparatus 100 is mounted on a surface portion at the front left side of a vehicle 200. In FIG. 1, the vehicle 200 is traveling straight ahead to the right in the plane of the figure.

In FIG. 1, a radar direction $\theta$ of the radar apparatus 100=0° is a radar axis direction. The "radar direction $\theta$" as used herein refers to a direction in which a reflection point of a radar transmission wave exists relative to the radar apparatus 100. In the example illustrated in FIG. 1, the radar direction $\theta$ of the radar apparatus 100 can take a value of −45° to +45°. That is, the radar viewing angle (the radar direction $\theta$) is 91°. In FIG. 1, the left side from a predetermined reference axis is referred to as a "negative area", and the right side therefrom is referred to as a "positive area". For example, for the radar apparatus 100, the predetermined reference axis is the direction in which $\theta$ is 0°, and for the moving direction of the vehicle, the predetermined reference axis is the forward direction of the vehicle 200. The forward direction of the vehicle 200 is a direction in which the vehicle 200 moves forward in a state in which a front-wheel steering angle is 0° (straight). Also, the "left side from the predetermined reference axis" refers to, for example, the counterclockwise direction from the predetermined reference axis in FIG. 1. The "right side from the predetermined reference axis" refers to, for example, the clockwise direction from the predetermined reference axis in FIG. 1.

In FIG. 1, when a stationary object exists at 90° at the left side with respect to the forward direction of the vehicle 200, that is, exists in the left direction just lateral to the vehicle 200 (i.e., exists in a zero-Doppler-velocity direction), the relative velocity (Doppler velocity) of the stationary object relative to the radar apparatus 100 is 0.

In FIG. 1, the direction at 90° (a zero-Doppler-velocity direction) at the left side with respect to the forward direction of the vehicle 200 is directed in a backward direction (i.e., a negative direction of the radar axis) of the vehicle 200 by $\theta_0$ from the radar axis direction of the radar apparatus 100. That is, when the zero-Doppler-velocity direction (the direction of 90° at the left side of the vehicle 200) is set as a radar direction $\alpha$ with respect to the radar apparatus 100, the radar direction $\alpha$ is equal to $-\theta_0$ and takes a negative value.

In FIG. 1, an angle made by the forward direction of the vehicle 200 and the radar axis direction ($\theta=0°$) is referred to as a "radar installation angle $\beta$". The radar installation angle $\beta$ is a value with respect to the forward direction of the vehicle 200 (i.e., the direction when the vehicle 200 is traveling straight ahead). The installation angle $\beta$ of the radar apparatus 100 installed at the left side of the vehicle 200 is leftward with respect to the forward direction of the vehicle 200 and is in a negative direction. When the forward direction of the vehicle 200 is assumed to be a reference, $\beta+\alpha=\beta-\theta_0=-90°$ is given in FIG. 1, and thus the installation angle 1 of the radar apparatus 100 is $-90°+\theta_0=-90°-\alpha=-(90°+\alpha)$.

In FIG. 1, when the moving direction of the vehicle 200 relative to the radar axis direction is defined as a radar moving direction $\theta_s$, $\theta_0+\theta_S$ is 90°, and the radar moving direction $\theta_s$ is $90°-\theta_0=90°+\alpha=-\beta$. That is, when the radar apparatus 100 is installed on a surface portion at the front left side of the vehicle 200, and the vehicle 200 is traveling straight ahead, it is possible to obtain an angle having an opposite polarity of the radar installation angle $\beta$, that is, $-\beta$, by determining the radar moving direction $\theta_s$.

Also, when the radar apparatus 100 is installed at the right side of the vehicle 200, and the vehicle 200 is traveling straight ahead, the Installation angle of the radar apparatus 100 is rightward with respect to the vehicle forward direction, which is a reference axis, p takes a positive value, and the relationship $\theta_s=-\beta$ similarly holds. Thus, by determining the radar moving direction $\theta_s$, it is possible to obtain the radar installation angle $\beta$.

However, for example, when the vehicle 200 travels in an urban area or the like, there are cases in which it does not travel straight ahead in the direction along the predetermined reference axis. There are also cases in which no stationary object exists in the width direction of the vehicle 200.

Figure 2:
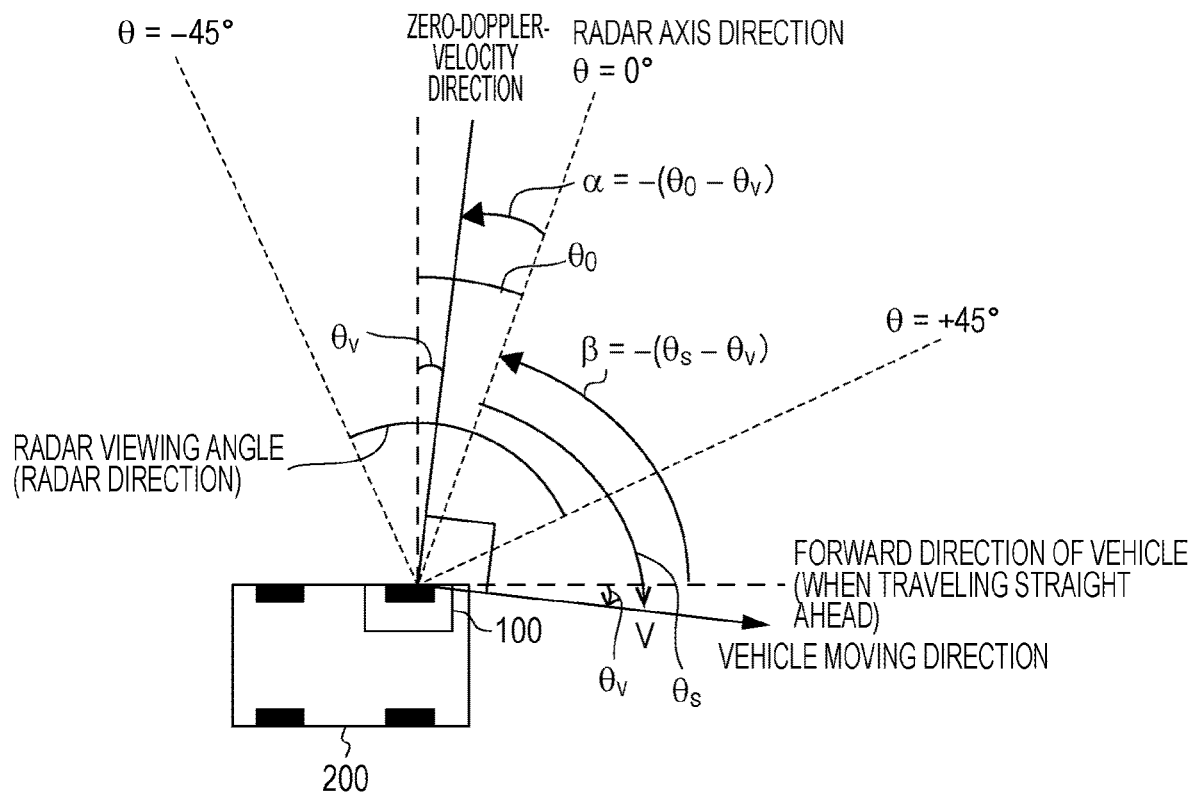
FIG. 2 is a diagram illustrating a state in which a vehicle is traveling in a vehicle moving direction with respect to a forward direction.

When the vehicle 200 is traveling in a vehicle moving direction $\theta_v$ relative to the forward direction (the straight-ahead direction), the radar direction $\alpha$ in which the Doppler velocity is 0 changes by an amount corresponding to the vehicle moving direction $\theta_v$ relative to the width direction of the vehicle 200, as illustrated in FIG. 2. FIG. 2 is a diagram illustrating a case in which the vehicle 200 is traveling in the vehicle moving direction $\theta_v$ relative to the forward direction (the straight-ahead direction). That is, when the vehicle 200 is traveling in the vehicle moving direction $\theta_v$ relative to the forward direction (the straight-ahead direction), the radar direction $\alpha$ in which the Doppler velocity is 0 is $-(\theta_0-\theta_v)$. In the present disclosure, $\theta_v$ has a negative (−) sign at the left side relative to the forward direction of the vehicle 200 and has a positive (+) sign at the right side relative to the forward direction of the vehicle 200. The "left side relative to the forward direction of the vehicle 200" refers to the counterclockwise direction relative to the forward direction of the vehicle 200 in FIG. 1. Also, the "right side relative to the forward direction of the vehicle 200" refers to the clockwise direction relative to the forward direction of the vehicle 200 in FIG. 1.

Figure 3:
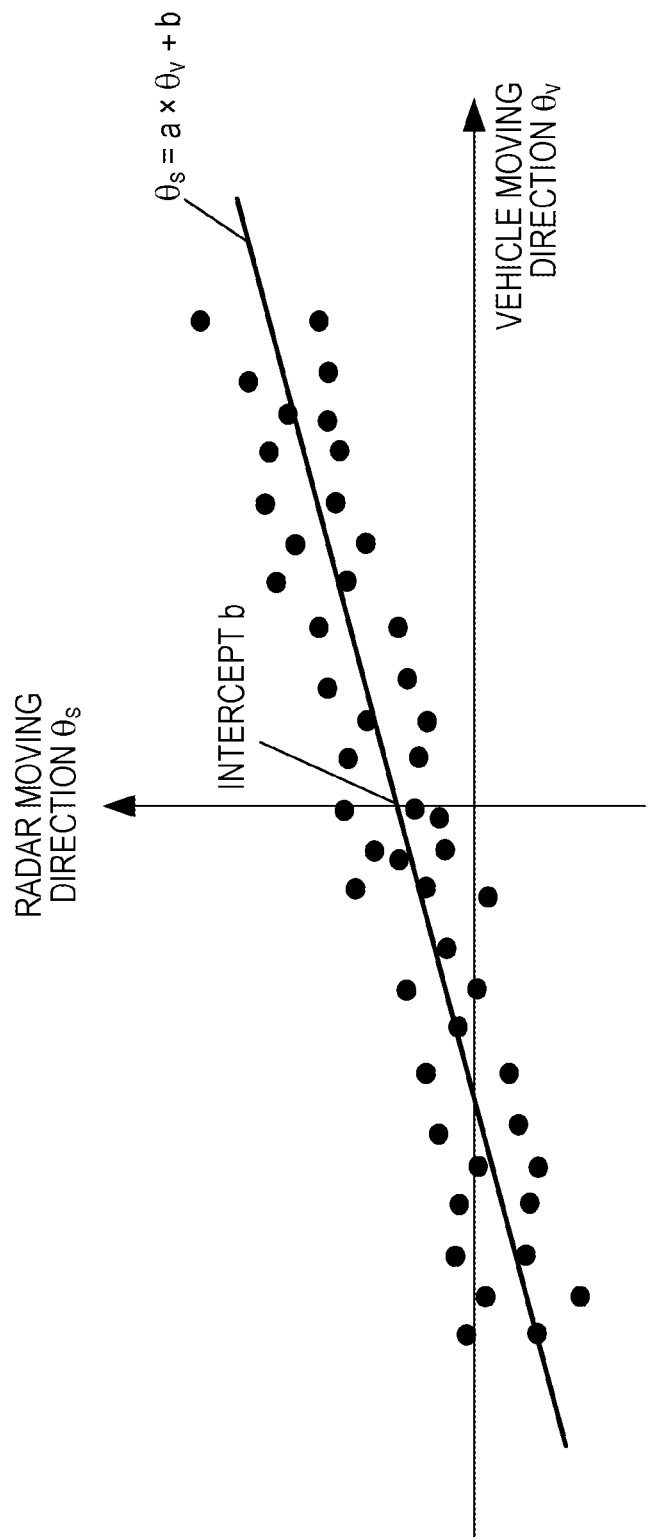
FIG. 3 is a graph for describing linear regression performed by a radar-installation-angle calculator.

Accordingly, in the present disclosure, the radar moving direction $\theta_s$ when the vehicle 200 is traveling straight ahead is determined by performing linear regression based on the number of samples which is larger than or equal to a predetermined number when the moving direction of the vehicle 200 is close to the straight-ahead direction. FIG. 3 is a graph for describing linear regression that uses the radar moving direction $\theta_s$ when the moving direction of the vehicle 200 is close to the straight-ahead direction.

In FIG. 3, the vertical axis represents the radar moving direction $\theta_s$, and the horizontal axis represents the vehicle moving direction $\theta_v$. Sample points that scatter in FIG. 3 each correspond to a sample indicating a relationship between the radar moving direction $\theta_s$ and the vehicle moving direction $\theta_v$ at a frame time point (unit time).

When the linear regression is performed based on the sample points to derive a straight line $\theta_s=a\times\theta_v+b$, the value of intercept b is the radar moving direction $\theta_s$ when the vehicle 200 is traveling straight ahead ($\theta_v=0°$), as illustrated in FIG. 3. Accordingly, as described above, when the vehicle 200 is traveling straight ahead ($\theta_v=0°$), the radar moving direction $\theta_s$ is $-\beta$, and thus the radar installation angle $\beta$ is a value having an opposite sign of $\theta_s$ when the vehicle 200 is traveling straight ahead. That is, $\beta$ is $-b$ (see FIG. 1). Thus, even when the vehicle 200 is not traveling straight, it is possible to accurately determine the radar installation angle.

As described above, in the present disclosure, the linear regression is performed based on the predetermined number of samples of reflection points at which the Doppler velocities are 0 when the vehicle 200 is not traveling straight ahead, as Illustrated in FIG. 2, to thereby accurately determine the radar installation angle. In the embodiment below, what is disclosed in the present disclosure will be described in more detail.

Embodiment of Present Disclosure

[Configuration of Radar Apparatus]

Figure 4:
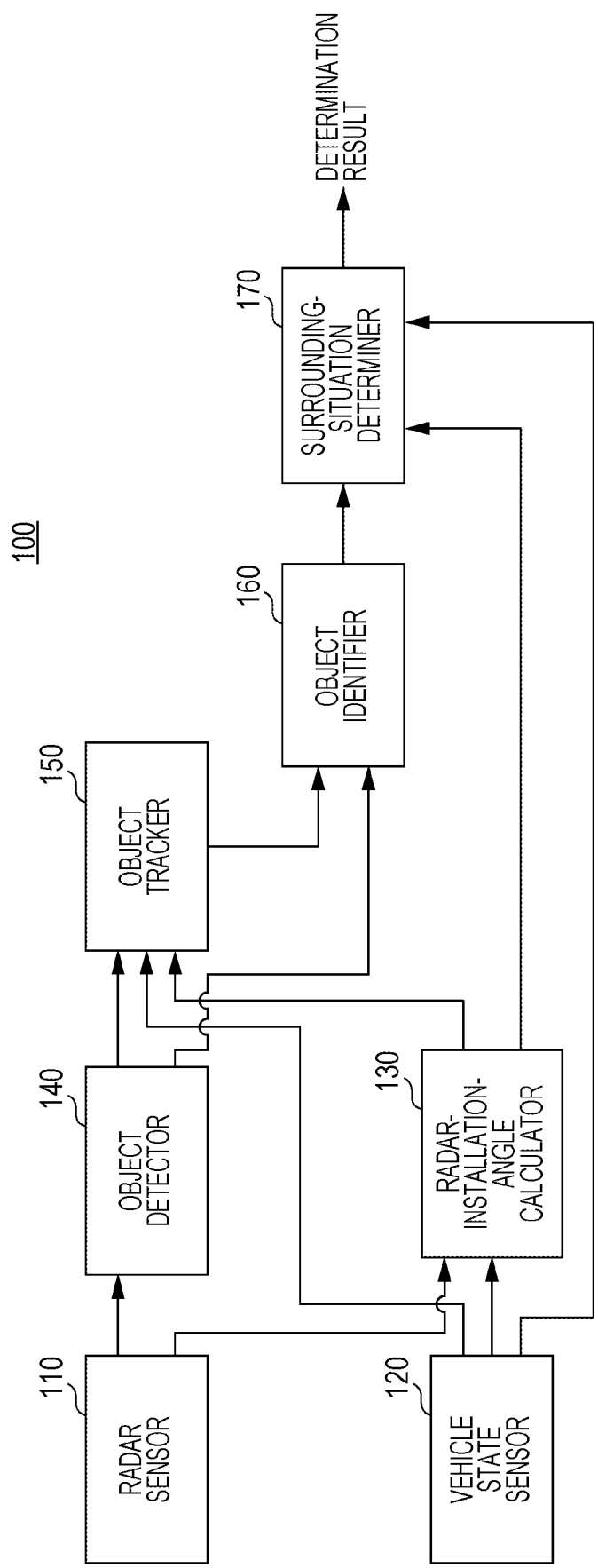
FIG. 4 is a diagram illustrating the configuration of the radar apparatus according to an embodiment of the present disclosure.

FIG. 4 is a diagram illustrating the configuration of the radar apparatus 100 according to the embodiment of the present disclosure. As Illustrated in FIG. 4, the radar apparatus 100 has a radar sensor 110, a vehicle state sensor 120, a radar-installation-angle calculator 130, an object detector 140, an object tracker 150, an object identifier 160, and a surrounding-situation determiner 170.

The radar sensor 110 employs, for example, a pulse system using a radar transmission wave in a millimeter waveband or a frequency modulated continuous wave (FMCW) system. The radar sensor 110 has an array antenna (not illustrated). The radar sensor 110 may be constituted by a plurality of sensors. The array antenna transmits a radar transmission wave and receives reflection waves resulting from reflection of the transmitted radar transmission wave by an object. When the array antenna receives reflection waves, the radar apparatus 100 performs frequency analysis and direction estimation on signals of branches corresponding to individual array elements. By doing so, the radar sensor 110 calculates various parameters (hereinafter referred to as "radar data"), such as the direction, the distance, a reflection wave intensity, and the Doppler velocity, of a reflection point by which the radar transmission wave is reflected, and outputs the radar data to the radar-installation-angle calculator 130 and the object detector 140. It is assumed that the radar sensor 110 is mounted on a surface portion at the front left side of the vehicle 200, as illustrated in FIG. 1.

The vehicle state sensor 120 is constituted by a plurality of sensors that detect the moving state of the vehicle 200. Parameters indicating the moving state of the vehicle 200 which is detected by the vehicle state sensor 120 include at least a vehicle velocity and a yaw rate or a vehicle velocity and a steering angle. For example, the vehicle velocity is detected by a vehicle-velocity sensor, the steering angle is detected by a steering-angle sensor provided for a steering wheel, and the yaw rate is detected by a yaw sensor. The vehicle state sensor 120 outputs the detected parameters (hereinafter referred to as "vehicle-moving state data") to the radar-installation-angle calculator 130, the object tracker 150, and the surrounding-situation determiner 170.

The radar-installation-angle calculator 130 calculates a radar installation angle in order to check whether or not the radar axis of the radar apparatus 100 is displaced, that is, whether or not the radar-transmission-wave radiation direction of the array antenna of the radar sensor 110 is displaced from a predetermined installation angle. The radar-installation-angle calculator 130 calculates the radar installation angle by using the radar data output from the radar sensor 110 and the vehicle-moving state data output from the vehicle state sensor 120 and outputs a calculation result to the object tracker 150 and the surrounding-situation determiner 170. A description of a radar-installation-angle calculating method for the radar-installation-angle calculator 130 is described later.

Based on the radar data output from the radar sensor 110, the object detector 140 detects the position (the direction and the distance), a relative velocity (a Doppler velocity), and so on of an object by which the radar transmission wave is reflected. The object detector 140 outputs a detection result (hereinafter referred to as "object data") to the object tracker 150 and the object identifier 160.

The object tracker 150 performs object tracking based on the vehicle-moving state data output from the vehicle state sensor 120, the radar installation angle output from the radar-installation-angle calculator 130, and the object data output from the object detector 140. The "object tracking" means tracking the position, the distance, the moving velocity, the moving direction, and so on of an object over a plurality of frames. The object tracker 150 outputs track data of the tracked object to the object identifier 160.

The object identifier 160 performs object identification based on the object data output from the object detector 140 and the track data output from the object tracker 150. The object identifier 160 outputs an identification result, obtained by the object identifier 160, to the surrounding-situation determiner 170.

Based on the vehicle-moving state data output from the vehicle state sensor 120, the radar installation angle output from the radar-installation-angle calculator 130, and the identification result of the object identifier 160, the surrounding-situation determiner 170 determines whether or not the surrounding situation of the vehicle 200 is safe. For example, the surrounding-situation determiner 170 may be adapted to determine that the surrounding situation is safe when an object that is likely to collide with the vehicle 200 does not exist and to determine that the surrounding situation is not safe when an object that is likely to collide with the vehicle 200 exists. Upon determining that the surrounding situation is not safe, for example, the surrounding-situation determiner 170 uses a warning unit (not illustrated) to given a notification indicating a result of the determination to the driver of the vehicle 200, people in the surroundings thereof, or the like or uses a control unit (not illustrated) to operate the brake to avoid a collision.

As described above, when the radar installation angle of the radar sensor 110 is axially displaced from a pre-stored radar installation angle at the time of factory shipment, it is difficult for the radar sensor 110 to obtain correct radar data. Thus, when the radar installation angle output from the radar-installation-angle calculator 130 differs from the radar installation angle at the time of factory shipment, the surrounding-situation determiner 170 does not give the notification indicating the determination result of the surrounding situation or gives a notification indicating that the radar installation angle is axial-displaced, simultaneously with giving the notification indicating the determination result of the surrounding situation. As a result, for example, the driver of the vehicle 200 can recognize that it is necessary to correct the axis displacement of the radar sensor 110.

[Configuration of Radar-Installation-Angle Calculator 130]

Figure 5:
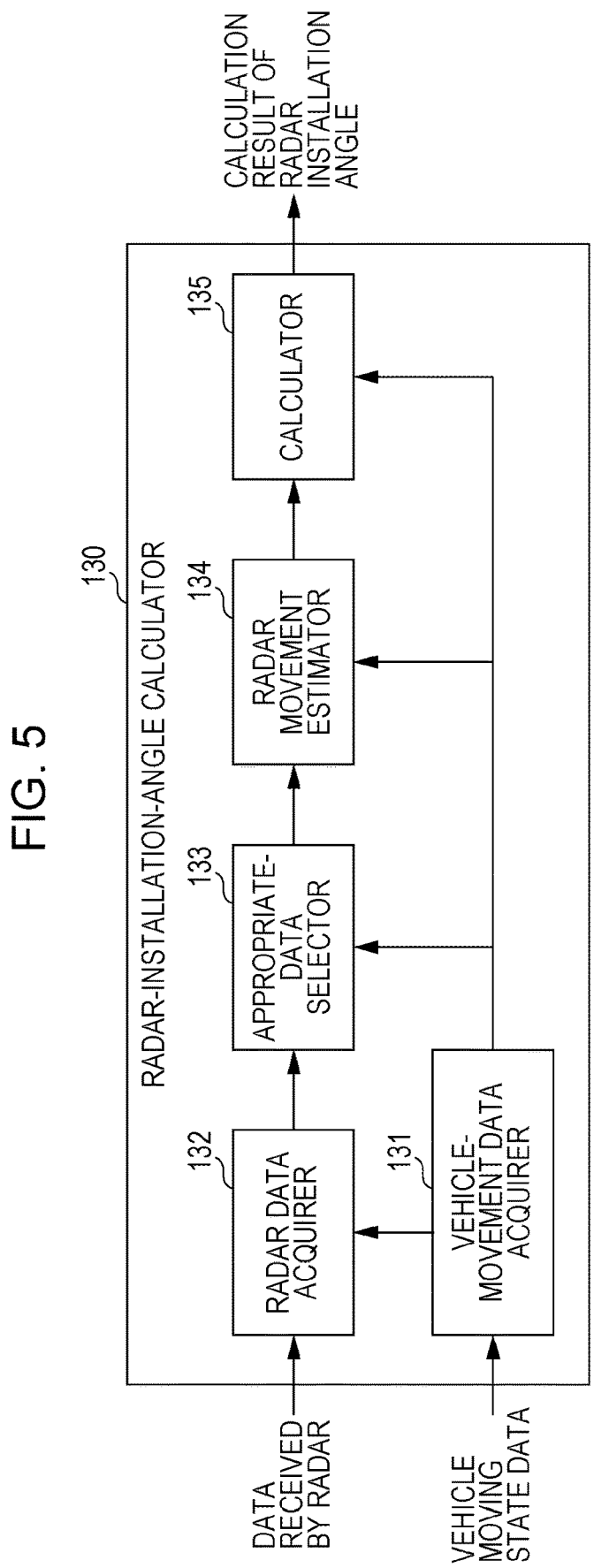
FIG. 5 is a diagram illustrating the configuration of the radar-installation-angle calculator.

Next, a description will be given of an example configuration of the radar-installation-angle calculator 130. FIG. 5 is a diagram illustrating the configuration of the radar-installation-angle calculator 130.

As illustrated in FIG. 5, the radar-installation-angle calculator 130 has a vehicle-movement data acquirer 131, a radar data acquirer 132, an appropriate-data selector 133, a radar movement estimator 134, and a calculator 135.

The vehicle-movement data acquirer 131 performs processing, such as filtering, on the vehicle-moving state data output from the vehicle state sensor 120 to calculate a vehicle velocity $V_v$ and the vehicle moving direction $\theta_v$. The vehicle moving direction $\theta_v$ is an angle made by the forward direction of the vehicle 200 and the moving direction of the vehicle 200 during measurement, as illustrated in FIG. 2. The vehicle-movement data acquirer 131 outputs information about the calculated vehicle velocity $V_v$ and vehicle moving direction $\theta_v$ to the radar data acquirer 132, the appropriate-data selector 133, the radar movement estimator 134, and the calculator 135.

Based on the information about the vehicle moving direction $\theta_v$ output from the vehicle-movement data acquirer 131, the radar data acquirer 132 determines whether or not the moving direction $\theta_v$ of the vehicle 200 is in an appropriate range for calculating the radar installation angle. The appropriate range of the moving direction $\theta_v$ of the vehicle 200 is, for example, the range of predetermined angles (e.g., within ±10) from the moving direction when the vehicle 200 travels straight ahead. The predetermined angles have values for performing the above-described linear regression illustrated in FIG. 3. That is, in order to accurately determine the intercept in the linear regression, the predetermined angles may be set in a large range so that the number of samples in the moving direction $\theta_v$ of the vehicle 200 increases.

However, when the vehicle 200 turns in the vehicle moving direction $\theta_v$ having a large absolute value (e.g., $\theta_v<-10°$, $+10°<\theta_v$), the possibility that the tire(s) of the vehicle 200 slip(s) is large, and the radar direction $\alpha$ in which the Doppler velocity is 0 does not satisfy an expression $\alpha=-(\theta_0-\theta_v)$, thus making it difficult to calculate the radar installation angle by using the method described above.

Although the predetermined vehicle moving direction $\theta_v$ from the vehicle forward direction has been described using a value smaller than ±10° by way of example, the range of the predetermined vehicle moving direction $\theta_v$ may be reduced (e.g., to ±2°) when provided increments of $\theta_v$ are reduced (e.g., to 0.1°).

As described above, upon determining that the moving direction $\theta_v$ of the vehicle 200 is not in the predetermined range, the radar data acquirer 132 ends the processing in a corresponding frame.

When the moving direction $\theta_v$ of the vehicle 200 is in the predetermined range, the radar data acquirer 132 generates a map on which reflection wave intensities from reflection points are plotted for respective radar directions and respective distances (ranges) from the radar apparatus, based on the radar data (the direction, the distance, the reflection wave intensity, the Doppler velocity, and so on of each reflection point) output from the radar sensor 110. The map on which the reflection wave intensities from reflection points are plotted for respective radar directions and respective distances from the radar apparatus is referred to as a "direction-range power map (a first data group, not illustrated)".

When the moving direction $\theta_v$ of the vehicle 200 is in the predetermined range, the radar data acquirer 132 generates a map on which the Doppler velocities of the reflection points are plotted for the respective radar directions and the respective distances (ranges) from the radar apparatus, based on the radar data output from the radar sensor 110. The map on which the Doppler velocities from reflection points are plotted for respective radar directions and respective distances from the radar apparatus is hereinafter referred to as a "direction-range Doppler map (a second data group, not illustrated)".

The radar data acquirer 132 outputs the generated direction-range power map and direction-range Doppler map to the appropriate-data selector 133.

Based on the direction-range power map and direction-range Doppler map output from the radar data acquirer 132, the appropriate-data selector 133 generates a map on which the reflection wave intensities from the reflection points are plotted for the respective radar directions and the respective Doppler velocities. The map on which the reflection wave intensities from reflection points are plotted for respective radar directions and respective Doppler velocities is hereinafter referred to as a "direction-Doppler power map (a third data group, see FIG. 6)".

The appropriate-data selector 133 determines whether or not the generated direction-Doppler power map is appropriate data for estimating the radar installation angle. A description of processing for the determination is described later. Upon determining that the generated direction-Doppler power map is appropriate data, the appropriate-data selector 133 outputs the direction-Doppler power map to the radar movement estimator 134.

By using the direction-Doppler power map output from the appropriate-data selector 133, the radar movement estimator 134 calculates the radar moving direction $\theta_s$. The radar moving direction $\theta_s$ in this case is a direction in which the radar moves relative to the radar axis direction ($\theta_s=0°$, i.e., the direction $\theta=0°$ illustrated in FIGS. 1 and 2). The radar movement estimator 134 calculates the radar moving direction $\theta_s$, for example, in the following manner.

Based on the direction-Doppler power map, the radar movement estimator 134 calculates the radar direction $\alpha$ in which the Doppler velocity is 0.

Figure 6:
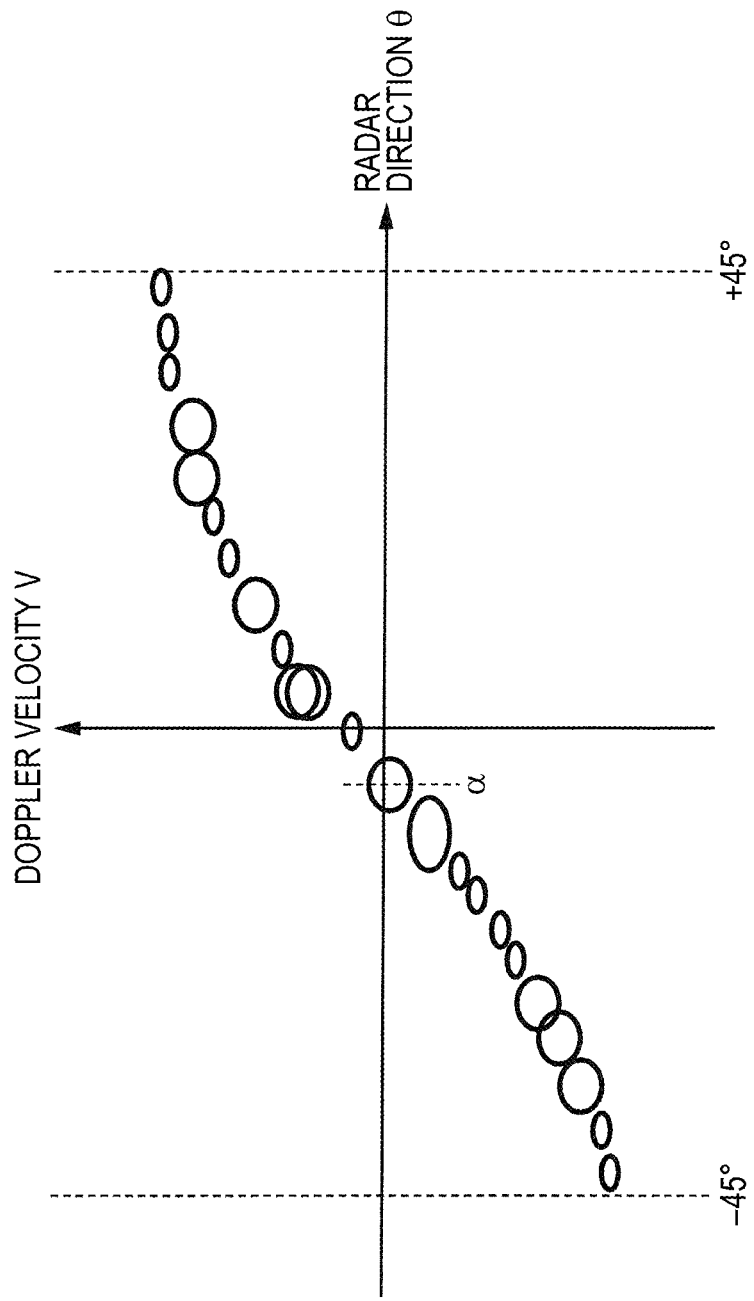
FIG. 6 illustrates a direction-Doppler power map generated by an appropriate-data selector.

FIG. 6 illustrates the direction-Doppler power map (the third data group) generation by the appropriate-data selector 133.

In FIG. 6, the horizontal axis represents the radar direction, and the vertical axis represents the Doppler velocity, each circle corresponds to a reflection wave signal, and the size of each circle indicates a reflection wave intensity. In FIG. 6, a larger size of the circle indicates a higher reflection wave intensity. In FIG. 6, with respect to a reflection wave signal that crosses the horizontal axis, that is, a reflection wave signal having a Doppler velocity of 0, the coordinate on the horizontal axis where the reflection wave signal crosses, that is, the radar direction $\theta$ in which the Doppler velocity is 0, is $\alpha$. In FIG. 6, $\alpha$ has a negative value.

As illustrated in FIG. 2, the direction $\alpha$ in which the Doppler velocity is 0 is $-(\theta_0-\theta_v)$ relative to the radar axis direction. The radar movement estimator 134 calculates the radar moving direction $\theta_s$ by using:

$$\theta_s = 90° - \theta_0 + \theta_v = 90° + \alpha \quad (1)$$

The radar movement estimator 134 outputs the radar moving direction $\theta_s$, calculated in the such a manner, to the calculator 135.

The calculator 135 stores a predetermined number of samples or more, each sample being constituted by the radar moving direction $\theta_s$ at a time point in a present frame, the radar moving direction $\theta_s$ being output from the radar movement estimator 134, and the vehicle moving direction $\theta_v$ output from the vehicle-movement data acquirer 131. In this case, one sample corresponds to the radar moving direction and the vehicle moving direction at one frame time point. The predetermined number is, for example, an empirically obtained number with which a sufficiently high accuracy can be obtained when the radar moving direction $\theta_s$ for the vehicle moving direction $\theta=0°$ is calculated using linear regression, and is thus a number determined depending on the use situation of the radar apparatus 100.

For example, the calculator 135 stores, in a buffer, a fixed number of pieces of data for each vehicle moving direction $\theta_v$ and performs computational operation over a plurality of frames to thereby make it possible to avoid an imbalance in data in a certain vehicle moving direction.

When the predetermined number of samples or more are obtained, the calculator 135 performs linear regression using the obtained samples. As described above and illustrated in FIG. 3, the calculator 135 derives a straight line $\theta_s = a \times \theta_v + b$ by performing linear regression based on the samples. The calculator 135 then calculates gradient a and intercept b of the derived equation.

As illustrated in FIG. 3, the value of intercept b is the radar moving direction $\theta_s$ when the vehicle 200 is traveling straight ahead ($\theta_v = 0°$, see FIG. 1). Thus, the radar installation angle β is −b. This allows the calculator 135 to calculate the radar installation angle β. The calculator 135 outputs the calculated radar installation angle β to the object tracker 150 and the surrounding-situation determiner 170 (see FIG. 4).

The above description has been given of the configuration of the radar-installation-angle calculator 130. Next, a description will be given of the determination as to whether or not the direction-Doppler power map generated by the appropriate-data selector 133 is appropriate data for estimating the radar installation angle.

{Appropriate-Data Determination Method 1}

Figure 7:
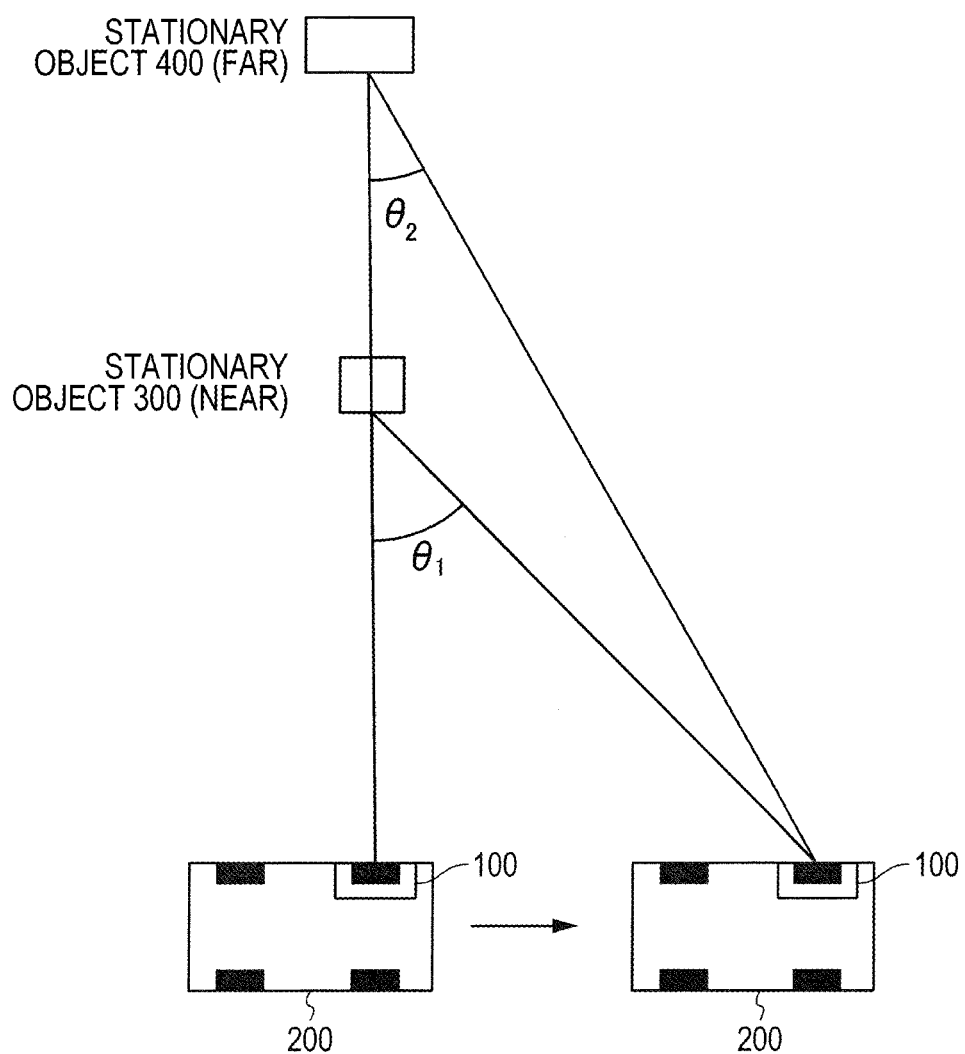
FIG. 7 is a diagram illustrating a state in which, when the vehicle is traveling straight ahead, two stationary objects exist in the same direction and at different distances relative to the radar apparatus.

First, consider a case in which, when the vehicle 200 is traveling, two stationary objects exist in substantially the same direction and at different distances relative to the radar apparatus 100 at the starting time of acquiring data in one frame. FIG. 7 is a diagram illustrating a state in which, when the vehicle 200 is traveling, two stationary objects exist in the same direction and at different distances relative to the radar apparatus 100 at the starting time of acquiring data in one frame.

In FIG. 7, a stationary object 300 exists in the direction of the left side surface of the vehicle 200, by way of example. Also, in FIG. 7, at the starting time of acquiring data in one frame, a stationary object 400 exists in a direction in which a line segment that connects the radar apparatus 100 and the stationary object 300 is extended beyond the stationary object 300 relative to the radar apparatus 100 mounted on the vehicle 200, by way of example. In this case, an angle made by a straight line that runs through the radar apparatus 100 and the stationary object 300 and a straight line that runs through the radar apparatus 100 and the stationary object 400 is approximately 0°.

Two stationary objects that exist in the same direction relative to the radar apparatus 100 at the starting time of acquiring data in one frame have theoretically the same Doppler velocity, even when the stationary objects exist at different distances (or, exist in different ranges). In this case, the radar sensor 110 performs, for each frame (e.g., a few tens of milliseconds), frequency analysis processing (e.g., a fast Fourier transform (FFT)) on received reflection wave signals, in order to determine an object Doppler velocity. For example, when one frame is 20 ms, and the velocity of the vehicle 200 is 36 km/h (10 m/s), the vehicle 200 travels 20 cm in one frame.

This means that, when the vehicle 200 travels a predetermined distance in one frame, reflection wave signals that the radar apparatus 100 obtains from the stationary objects 300 and 400 in the frame have differences of angles $\theta_1$ and $\theta_2$, respectively. More specifically, for example, when the distance between the stationary object 300 and the vehicle 200 (the radar apparatus 100) is 4 m, and the stationary object 300 is located in a direction in which the Doppler velocity is zero at the starting time of one frame (i.e., is located at 90° to the left side surface of the vehicle at the starting time), the position of the vehicle 200 moves 20 cm until the frame ends. Hence, $\theta_1$ is given by arctan(0.2/4)≈3°, and thus, the direction of the stationary object 300 at the end of the frame is −3° from the direction of the stationary object at the start of the frame. Thus, radar data acquired as data in the frame includes a direction error of 3°.

On the other hand, as is apparent from FIG. 7, since the distance from the radar apparatus 100 to the stationary object 400 is larger than the distance from the radar apparatus 100 to the stationary object 300, the angle $\theta_2$ is smaller than the angle $\theta_1$.

Hence, the direction-Doppler power map generated using the reflection wave signals from the stationary object 300, which has a smaller distance from the radar apparatus 100, is larger in the direction error generated by vehicle movement than the direction-Doppler power map generated using the reflection wave signals from the stationary object 400, which has a larger distance from the radar apparatus 100, and is thus low in reliability.

Although an example in which the angle made by the straight line that runs through the radar apparatus 100 and the stationary object 300 and the straight line that runs through the radar apparatus 100 and the stationary object 400 is approximately 0° has been described with reference to FIG. 7, the angle does not necessarily have to be approximately 0°. For example, as long as the straight line that runs through the radar apparatus 100 and the stationary object 300 and the straight line that runs through the radar apparatus 100 and the stationary object 400 is within a predetermined range (e.g., within 5°), the computational operation may be performed using the stationary object 400.

With the above-described processing, when a plurality of reflection points having the same direction and the same Doppler velocity exists, the appropriate-data selector 133 can generate a more appropriate direction-Doppler power map by using the reflection wave intensity and the Doppler velocity due to a reflection point at the largest distance (range) from the radar apparatus 100.

{Appropriate-Data Determination Method 2}

Consider a case in which, for example, the vehicle 200 moves in an oblique direction at a predetermined angle relative to the vehicle forward direction, as illustrated in FIG. 2. In this case, when the radar installation angle is denoted by β, and the velocity of the vehicle 200 is denoted by $V_v$, the relative velocity (Doppler velocity V) of a stationary object in the radar direction θ relative to the radar apparatus 100 is given by:

$$V = V_v \cos(-\beta + \theta_v - \theta) \quad (2)$$

In this case, it is assumed that the stationary object exists in the direction θ with respect to the radar apparatus 100 (i.e., with respect to the radar axis direction θ=0°).

For $\cos(-\beta + \theta_v - \theta) = 0$, the Doppler velocity of an object that exists in the direction θ is 0. However, Doppler velocity resolution that can be measured by the radar apparatus 100, that is, a Doppler velocity variation that can be distinguished by the radar apparatus 100, is limited. Thus, when the vehicle velocity is lower than a predetermined threshold velocity, there are cases in which a plurality of reflection points at which the Doppler velocities are 0 exists.

Specifically, for example, when the radar apparatus 100 can detect a Doppler velocity in increments of 1.0 km/h, and the vehicle velocity $V_v$ is 10 km/h, the Doppler velocity is given in the range of ±2.5° of the radar direction in which the Doppler velocity is 0, as in mathematical expression (3):

$$|V| < |10 \times \cos(90° \pm 2.5°)| = \text{about } 0.4 \text{ km/h} \quad (3)$$

Since the resolution of the radar apparatus 100 is 1.0 km/h, it is difficult for the radar apparatus 100 to detect the Doppler velocity in the above-described case. This is because, when the result of mathematical expression (3) is rounded, the Doppler velocity corresponds to a bin of zero Doppler velocity.

When the vehicle velocity is lower than the predetermined vehicle velocity, the direction-Doppler power map generated by the appropriate-data selector 133 is illustrated as in FIG. 8. FIG. 8 illustrates the direction-Doppler power map when the velocity of the vehicle 200 is lower than the predetermined threshold velocity.

In FIG. 8, the horizontal axis represents the radar direction, and the vertical axis represents the Doppler velocity, each circle corresponds to a reflection wave signal, and the size of each circle indicates a reflection wave intensity. In FIG. 8, a larger size of the circle indicates a higher reflection wave intensity. In FIG. 8, a plurality of reflection points at which the Doppler velocities are 0 exists. This is because, since the velocity of the vehicle 200 is lower than the predetermined threshold velocity, as described above, it is difficult for the radar apparatus 100 to detect an appropriate Doppler velocity, and thus the Doppler velocity is 0.

When a plurality of reflection points at which the Doppler velocities are 0 exists, as denoted by a portion 801 surrounded by a dotted-line square in FIG. 8, it is difficult for the radar movement estimator 134 to generate appropriate samples. Thus, when the velocity of the vehicle 200 is lower than the predetermined threshold velocity (e.g., 10 km/h noted above), the appropriate-data selector 133 discards the direction-Doppler power map in the corresponding frame, regarding the map as being inappropriate.

{Appropriate-Data Determination Method 3}

Figure 9A:
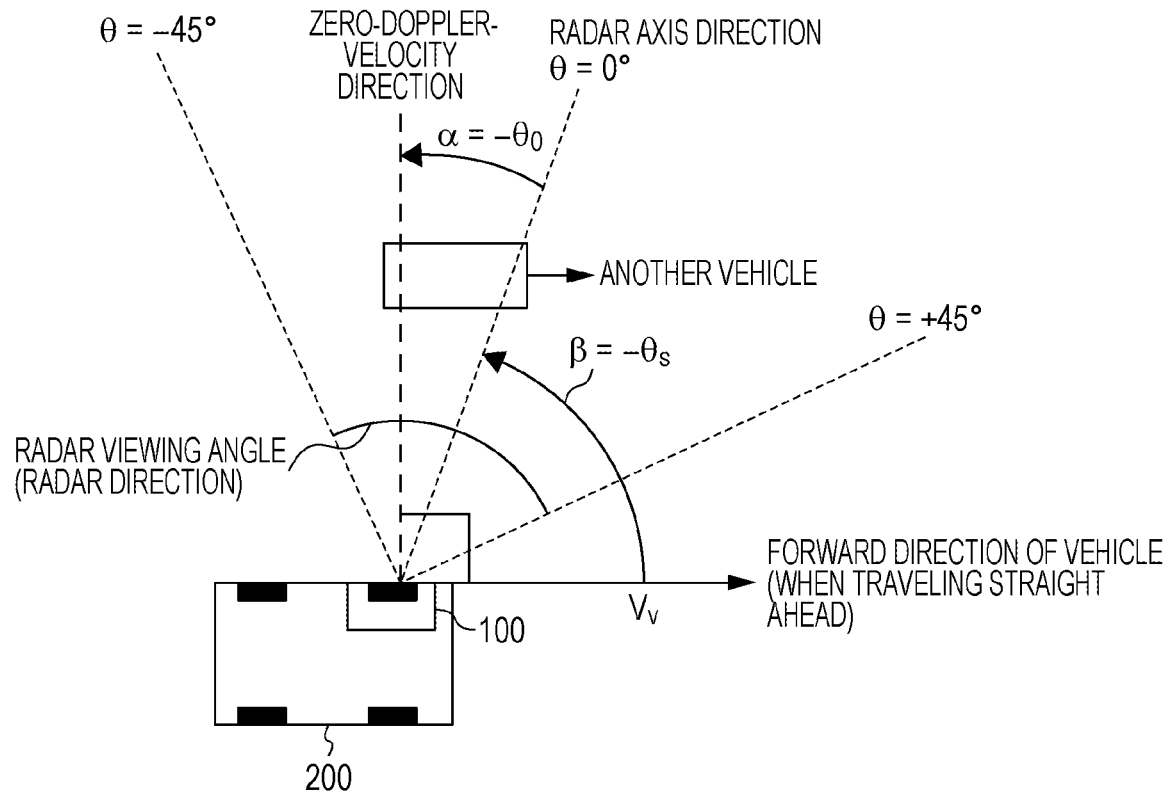
FIG. 9A is a diagram illustrating a state in which another vehicle is traveling side-by-side in a next lane of a lane in which the vehicle is traveling.
Figure 9B:
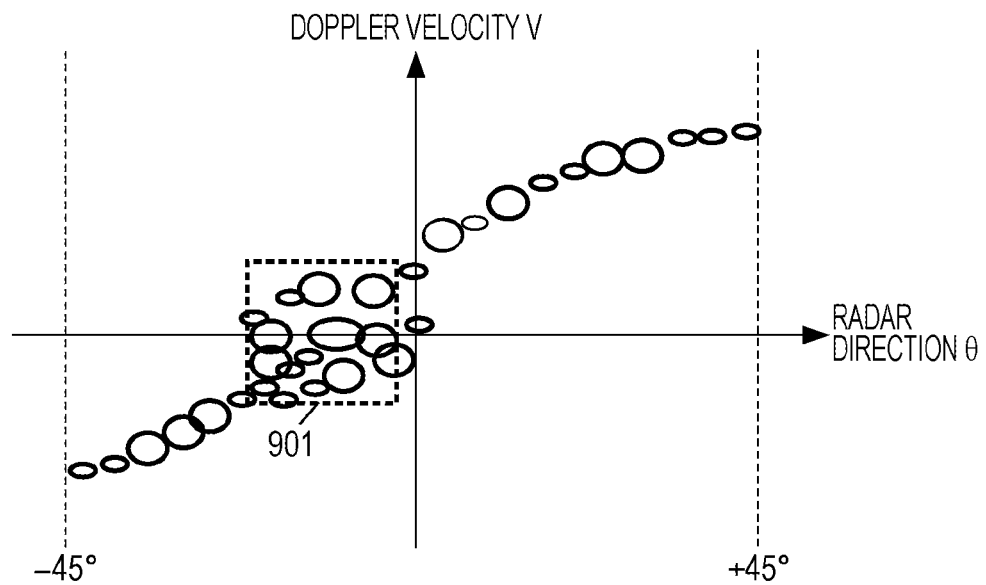
FIG. 9B is a diagram illustrating the direction-Doppler power map when another vehicle is traveling side-by-side in a next lane of a lane in which the vehicle is traveling.

Consider a case in which another vehicle is traveling side-by-side in a next lane of a lane in which the vehicle 200 is traveling. FIG. 9A is a diagram illustrating a state in which another vehicle is traveling side-by-side in a next lane of a lane in which the vehicle 200 is traveling. In such a case, the distance between the vehicle 200 and the vehicle traveling side-by-side therewith is small, and the relative velocity is also low. Hence, the direction-Doppler power map obtained in such a state is becomes a direction-Doppler power map as illustrated in FIG. 9B by way of example. FIG. 9B is a diagram illustrating the direction-Doppler power map when another vehicle is traveling side-by-side in the next lane of the lane in which the vehicle 200 is traveling.

In FIG. 9B, the horizontal axis represents the radar direction, and the vertical axis represents the Doppler velocity, each circle corresponds to a reflection wave signal, and the size of each circle indicates a reflection wave intensity. In FIG. 9B, a larger size of the circle indicates a higher reflection wave intensity. As denoted by a portion 901 surrounded by a dotted-line square in FIG. 9B, reflection points corresponding to the vehicle traveling side-by-side form a large chunk across the Doppler velocity "0" over a large direction width. With such a direction-Doppler power map, it is difficult for the radar movement estimator 134 to generate appropriate samples.

Thus, when a vehicle is traveling side-by-side with and near the vehicle 200, the appropriate-data selector 133 discards the direction-Doppler power map on which a plurality of reflection points at which the Doppler velocities V are 0 exists in a predetermined range (a portion 901) across the axis of the radar direction (Doppler velocity "0"), as illustrated in FIG. 9B, regarding the direction-Doppler power map as being inappropriate.

Specifically, for example, the appropriate-data selector 133 performs clustering including the reflection points that exist in the vicinity of the radar direction axis in addition to the reflection points that exist on the radar direction axis. Also, upon determining that the number of reflection points that exist in the clustered range and that exist on and near the radar direction axis is larger than or equal to a predetermined number, the appropriate-data selector 133 discards the direction-Doppler power map, regarding it as being inappropriate. The predetermined number can be determined for each system on which the radar apparatus is mounted, and is, for example, 10.

That is, when the number of reflection points that exist on and near the radar direction axis is larger than or equal to the predetermined number, the appropriate-data selector 133 discards the direction-Doppler power map, regarding it as being inappropriate.

The appropriate-data selector 133 may count the number of reflection points on the radar direction axis, excluding the reflection points near the radar direction axis from the counting, and when the number of reflection points on the radar direction axis is larger than or equal to a predetermined number (e.g., 3), the appropriate-data selector 133 may discard the direction-Doppler power map, regarding it as being inappropriate, considering the computational cost.

Also, when the number of reflection points that exist on the radar direction axis is one, the appropriate-data selector 133 does not necessarily have to discard the direction-Doppler power map.

{Appropriate-Data Determination Method 4}

Figure 10:
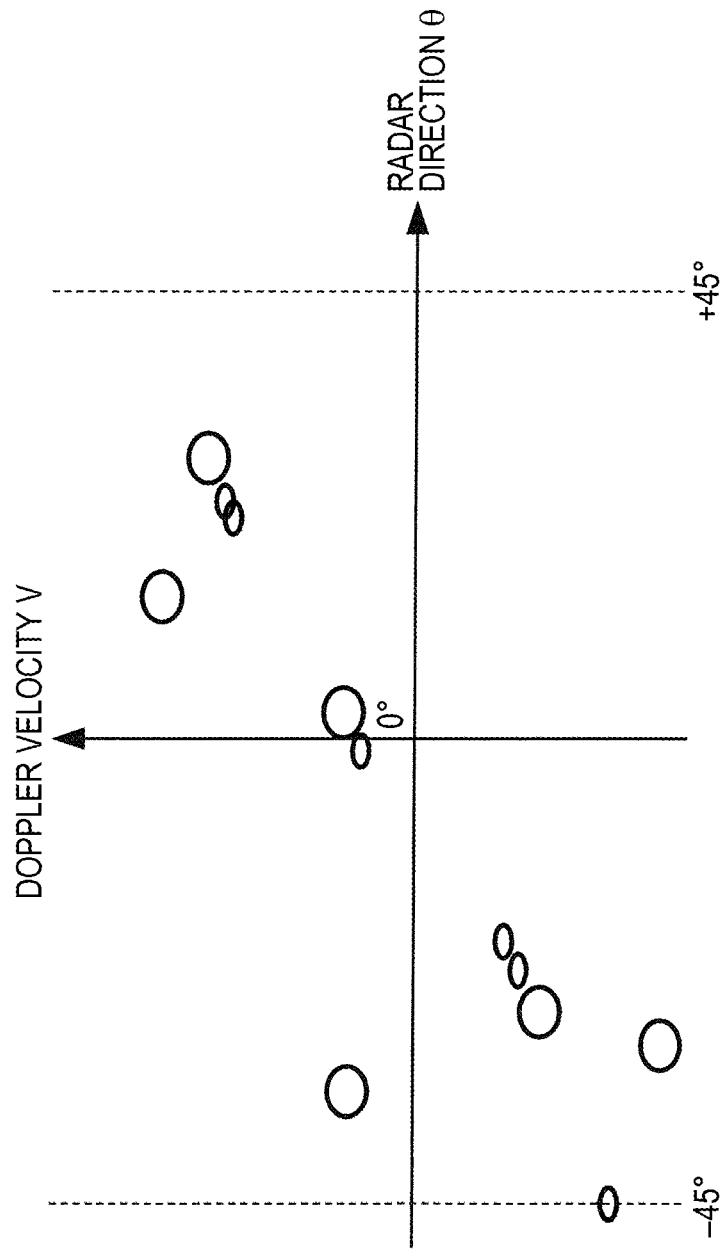
FIG. 10 illustrates the direction-Doppler power map when the number of reflection points is small.

For example, when no object exists in the range of a predetermined distance from the vehicle 200, the number of reflection points is smaller than that in a case in which an object exists in the range of the predetermined distance from the vehicle 200. FIG. 10 illustrates the direction-Doppler power map when the number of reflection points is small. More specifically, FIG. 10 illustrates the direction-Doppler power map when no object, except a road surface, exists within the horizontal-angle range for radar measurement, for example, in an environment, such as a large parking space. That is, in FIG. 10, the stationary object 300 and the stationary object 400 are not located at predetermined distances from the vehicle 200, unlike the case in FIG. 7, and another vehicle is not located at a predetermined distance from the vehicle 200, unlike the case in FIG. 9A. In FIG. 10, the horizontal axis represents the radar direction, and the vertical axis represents the Doppler velocity, each circle corresponds to a reflection wave signal, and the size of each circle indicates a reflection wave intensity. In FIG. 10, a larger size of the circle indicates a higher reflection wave intensity. With the direction-Doppler power map on which a small number of reflection points exist, as in FIG. 10, it is difficult for the radar movement estimator 134 to generate appropriate samples. Thus, with respect to the direction-Doppler power map, the appropriate-data selector 133 detects reflection points, for example, in increments of 1° for θ=−45° to +45°, and when a predetermined number of reflection points or more are not detected, the appropriate-data selector 133 discards the direction-Doppler power map, regarding it as being inappropriate. The predetermined number may be 50% of the total number of reflection point detection units (i.e., the number of reflection points detected in a predetermined time unit determined by a system, for example, direction bins).

The above description has been given of an appropriate-data selecting method for the appropriate-data selector 133. Next, a description will be given of an example operation of the radar-installation-angle calculator 130.

[Example Operation of Radar-Installation-Angle Calculator 130]

FIG. 11 is a flowchart illustrating an example operation of the radar-installation-angle calculator 130.

In step (hereinafter denoted as "ST") 101, the vehicle-movement data acquirer 131 calculates the vehicle velocity $V_v$ and the vehicle moving direction $\theta_v$, based on vehicle-moving state data (e.g., the vehicle velocity, and the yaw rate or steering angle) output from the vehicle state sensor 120 and outputs the vehicle velocity $V_v$ and the vehicle moving direction $\theta_v$ to the radar data acquirer 132, the appropriate-data selector 133, the radar movement estimator 134, and the calculator 135.

In ST102, the radar data acquirer 132 determines whether or not the vehicle moving direction $\theta_v$ is smaller than a predetermined angle range (e.g., ±10).

If it is determined in ST102 that the vehicle moving direction $\theta_v$ is in the predetermined angle range, the process proceeds to ST103 (YES in ST102). Otherwise (NO in ST102), the process returns to ST101.

In ST103, the radar data acquirer 132 acquires radar data output from the radar sensor 110. The radar data includes, for example, a reflection wave intensity in a radar direction-range coordinate system and a relative velocity (Doppler velocity) relative to the radar apparatus 100. The radar data acquirer 132 further generates a direction-range power map and a direction-range Doppler map.

In ST104, based on the direction-range power map and the direction-range Doppler map, the appropriate-data selector 133 generates a direction-Doppler power map. In this case, when a plurality of reflection points having the same direction and the same Doppler velocity exists, the appropriate-data selector 133 uses the reflection point having the largest distance (range) from the radar apparatus 100 to generate the direction-Doppler power map (refer to appropriate-data determination method 1 described above).

In ST105, the appropriate-data selector 133 determines, for each frame, whether or not the generated direction-Doppler power map is appropriate data. A determination method in ST105 is, for example, any of appropriate-data determination methods 2 to 4 described above. If the appropriate-data selector 133 determines that the direction-Doppler power map in the corresponding frame is appropriate (YES in ST105), the process proceeds to ST106. Otherwise (NO in ST105), the process returns to ST101 and proceeds to processing for a next frame.

In ST106, by using the direction-Doppler power map determined to be appropriate, the radar movement estimator 134 calculates the radar moving direction $\theta_s$. A calculation method for the radar moving direction $\theta_s$ is substantially the same as that described above.

In ST107, the calculator 135 stores the radar moving direction $\theta_s$ calculated by the radar movement estimator 134, and the vehicle moving direction $\theta_v$, output from the vehicle-movement data acquirer 131, as one sample for linear regression. Upon storing the sample for the linear regression, the calculator 135 increments the number of samples by 1.

In ST108, the calculator 135 determines whether or not the number samples for the linear regression exceeds a predetermined number. If the calculator 135 determines that the number samples for the linear regression exceeds the predetermined number (YES in ST108), the process proceeds to ST109; otherwise (NO in ST108), the process returns to ST101 and proceeds to processing for a next frame.

In ST109, by using the stored samples for the linear regression, the calculator 135 derives an expression $\theta_s = a \times \theta_v + b$ indicating the relationship between the radar moving direction $\theta_s$ and the vehicle moving direction $\theta_v$. Intercept b of the derived expression corresponds to the radar moving direction $\theta_s$ when the vehicle 200 is traveling straight ahead ($\theta_v = 0$), as described above, and the radar installation angle β is −b, as illustrated in FIG. 1. Thus, the calculator 135 can calculate the radar installation angle β.

In ST110, the radar-installation-angle calculator 130 determines whether or not the processing is to be continued. The radar-installation-angle calculator 130 may make the determination, for example, by determining whether or not an instruction for suspending the processing is externally input to the radar-installation-angle calculator 130. If the radar-installation-angle calculator 130 determines that the processing is to be continued (YES in ST110), the process returns to ST101 and proceeds to processing for a next frame. Otherwise (NO in ST110), the radar-installation-angle calculator 130 ends the processing.

As described above, the radar apparatus 100 according to the embodiment of the present disclosure has the radar-installation-angle calculator 130. The radar-installation-angle calculator 130 calculates a radar moving direction, which is a vehicle moving direction relative to the radar axis direction, based on the radar direction in which the Doppler velocity of a reflection point is 0 when the vehicle 200 is not traveling straight ahead. The radar-installation-angle calculator 130 then performs linear regression based on samples in a plurality of frames to estimate a radar moving direction when the vehicle 200 is traveling straight ahead and calculates a radar installation angle by using the estimated radar moving direction. In this case, the radar-installation-angle calculator 130 determines whether or not the samples in the plurality of frames are appropriate and discards the samples in the frames when the samples are not appropriate.

That is, the radar-installation-angle calculator 130 discards data in the frames in which the velocity of the vehicle 200 is higher than or equal to a predetermined threshold (e.g., 10 km/h) and the moving direction of the vehicle 200 is not in a predetermined range (e.g., ±10°). The radar-installation-angle calculator 130 also discards data in a frame in which the number of reflection points at which the Doppler velocities V are 0 is larger than or equal to a predetermined number (e.g., two or more). In addition, the radar-installation-angle calculator 130 discards data in a frame in which the number of reflection points is smaller than a predetermined number (e.g., 50% of reflection points in the radar direction).

With such a configuration, even when the vehicle 200 is not traveling straight ahead, it is possible to calculate a radar moving direction when the vehicle 200 is traveling straight ahead by performing linear regression based on appropriate samples. Thus, the radar-installation-angle calculator 130 can accurately calculate a radar installation angle even when the vehicle 200 is not traveling straight ahead.

Also, according to the radar apparatus 100 having the above-described radar-installation-angle calculator 130, it is possible to determine whether or not an axis is displaced from a predetermined angle (e.g., an angle at the time of factory shipment) by monitoring the radar installation angle. This makes it possible to prevent outputting of an inaccurate radar detection result due to axis displacement of the radar installation angle.

Although some embodiments have been described above with reference to the accompanying drawings, it goes without saying that the present disclosure is not limited to such examples. It is apparent to those skilled in the art that various variations and modifications can be conceived within the scope recited in the claims, and it is to be understood that such variations and modifications also naturally belong to the technical scope of the present disclosure. The constituent elements in the embodiment described above may also be combined together in a scope without departing from the spirit of the present disclosure.

BRIEF SUMMARY OF THE PRESENT DISCLOSURE

A radar-installation-angle calculating device according to a first aspect of the present disclosure is directed to a radar-installation-angle calculating device for a radar apparatus mounted on a vehicle. The radar-installation-angle calculating device includes: radar data acquisition circuitry that generates a first data group and a second data group for each frame of a plurality of frames by using information regarding a velocity of the vehicle and a moving direction of the vehicle, the first data group indicating a plurality of reflection wave intensities from a plurality of reflection points with respect to radar directions and distances from the radar apparatus to the reflection points, the second data group indicating Doppler velocities of the reflection points with respect to the radar directions and the distances from the radar apparatus to the reflection points, and the radar directions indicating directions in which the corresponding reflection points exist relative to the radar apparatus; data selection circuitry that generates a third data group by using the first data group and the second data group, the third data group indicating the reflection wave intensities from the reflection points with respect to the radar directions and the Doppler velocities; radar movement estimation circuitry that calculates a radar moving direction for each of the plurality of frames, based on the third data group, the radar moving direction indicating a moving direction of the radar apparatus relative to the moving direction of the vehicle; and calculation circuitry that estimates the radar moving direction in a state in which the moving direction of the vehicle is straight ahead, by using the radar moving direction relative to the moving direction of the vehicle in a determined number of frames of the plurality of frames, and that calculates the radar installation angle by using the estimated radar moving direction.

In a radar-installation-angle calculating device according to a second aspect of the present disclosure, the radar movement estimator may calculate, for each of the frames, the radar moving direction relative to the moving direction of the vehicle, when the moving direction of the vehicle is in a predetermined range with respect to the state in which the moving direction of the vehicle is straight ahead.

In a radar-installation-angle calculating device according to a third aspect of the present disclosure, by using linear regression, the calculator may estimate the radar moving direction in the state in which the moving direction of the vehicle is straight ahead.

In a radar-installation-angle calculating device according to a fourth aspect of the present disclosure, the data selector may generate the third data group, when the velocity of the vehicle is higher than or equal to a predetermined threshold, and the moving direction of the vehicle is within a predetermined range.

In a radar-installation-angle calculating device according to a fifth aspect of the present disclosure, the data selector may generate the third data group, when the number of reflection points at which the Doppler velocities are zero is smaller than a predetermined number.

In a radar-installation-angle calculating device according to a sixth aspect of the present disclosure, the data selector may generate the third data group, when the number of reflection points is larger than or equal to a predetermined number.

In a radar-installation-angle calculating device according to a seventh aspect of the present disclosure, when a plurality of reflection points having the same radar direction and the same Doppler velocity exists, the data selector may generate, as the third data group, the reflection wave intensity and the Doppler velocity of the reflection point having a largest distance from the radar apparatus.

A radar apparatus according to an eighth aspect of the present disclosure is directed to a radar apparatus mounted on a vehicle. The radar apparatus includes: a radar-installation-angle calculating device that estimates an installation angle of the radar apparatus; and a determiner that determines whether or not the estimated installation angle is displaced from a predetermined installation angle. The radar-installation-angle calculating device has: a radar data acquirer that generates a first data group and a second data group for each of a plurality of frames by using information regarding a velocity of the vehicle and a moving direction of the vehicle, the first data group indicating reflection wave intensities from reflection points with respect to radar directions and distances from the radar apparatus to the reflection points, the second data group indicating Doppler velocities of the reflection points with respect to the radar directions and the distances from the radar apparatus to the reflection points, and the radar directions indicating directions in which the corresponding reflection points exist relative to the radar apparatus; a data selector that generates a third data group by using the first data group and the second data group, the third data group indicating the reflection wave intensities of the reflection points with respect to the radar directions and the Doppler velocities; a radar movement estimator that calculates a radar moving direction for each frame, based on the third data group, the radar moving direction indicating a moving direction of the radar apparatus relative to the moving direction of the vehicle; and a calculator that estimates the radar moving direction in a state in which the moving direction of the vehicle is straight ahead, by using the radar moving direction relative to the moving direction of the vehicle in a predetermined number of frames of the frames, and that calculates the radar installation angle by using the estimated radar moving direction.

A radar-installation-angle calculating method according to a ninth aspect of the present disclosure is directed to a radar-installation-angle calculating method for a radar apparatus mounted on a vehicle. The method includes: generating a first data group and a second data group for each frame by using information regarding a velocity of the vehicle and a moving direction of the vehicle, the first data group indicating reflection wave intensities from reflection points with respect to radar directions and distances from the radar apparatus to the reflection points, the second data group indicating Doppler velocities of the reflection points with respect to the radar directions and the distances from the radar apparatus to the reflection points, and the radar directions indicating directions in which the corresponding reflection points exist relative to the radar apparatus; generating a third data group by using the first data group and the second data group, the third data group indicating the reflection wave intensities of the reflection points with respect to the radar directions and the Doppler velocities; calculating a radar moving direction for each frame, based on the third data group, the radar moving direction Indicating a moving direction of the radar apparatus relative to the moving direction of the vehicle; and estimating the radar moving direction in a state in which the moving direction of the vehicle is straight ahead, by using the radar moving direction relative to the moving direction of the vehicle in a predetermined number of frames of the frames, and that calculates the radar installation angle by using the estimated radar moving direction.

Although an example in which the present disclosure is configured using hardware has been described above, the present disclosure can be realized by software, hardware, or software in cooperation with hardware.

Each functional block used in the description of each embodiment described above can be partly or entirely realized by a large-scale integration (LSI) such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an integrated circuit (IC), a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a field programmable gate array (FPGA) that can be programmed after the manufacture of the LSI or a reconfigurable processor in which the connections and the settings of circuit cells arranged Inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure is applicable to a radar apparatus that detects an object and that tracks the object that is moving.

What is claimed is:

1. A radar-installation-angle calculating device for a radar apparatus mounted on a vehicle, the radar-installation-angle calculating device comprising:
   radar data acquisition circuitry that generates a first data group and a second data group for each frame of a plurality of frames by using information regarding a velocity of the vehicle and a moving direction of the vehicle, the first data group indicating a plurality of reflection wave intensities from a plurality of reflection points with respect to radar directions and distances from the radar apparatus to the reflection points, the second data group indicating Doppler velocities of the reflection points with respect to the radar directions and the distances from the radar apparatus to the reflection points, and the radar directions indicating directions in which the corresponding reflection points exist relative to the radar apparatus;
   data selection circuitry that generates a third data group by using the first data group and the second data group, the third data group indicating the reflection wave intensities from the reflection points with respect to the radar directions and the Doppler velocities;
   radar movement estimation circuitry that calculates a radar moving direction for each of the plurality of frames, based on the third data group, the radar moving direction indicating a moving direction of the radar apparatus relative to the moving direction of the vehicle; and
   calculation circuitry that estimates the radar moving direction in a state in which the moving direction of the vehicle is straight ahead, by using the radar moving direction relative to the moving direction of the vehicle in a determined number of frames of the plurality of frames, and that calculates the radar installation angle by using the estimated radar moving direction.

2. The radar-installation-angle calculating device according to claim 1,
   wherein the radar movement estimation circuitry calculates, for each of the plurality of frames, the radar moving direction relative to the moving direction of the vehicle, when the moving direction of the vehicle is in a determined range with respect to the state in which the moving direction of the vehicle is straight ahead.

3. The radar-installation-angle calculating device according to claim 1,
   wherein by using linear regression, the calculation circuitry estimates the radar moving direction in the state in which the moving direction of the vehicle is straight ahead.

4. The radar-installation-angle calculating device according to claim 1,
   wherein the data selection circuitry generates the third data group, when the velocity of the vehicle is higher than or equal to a determined threshold, and the moving direction of the vehicle is within a determined range.

5. The radar-installation-angle calculating device according to claim 1,
   wherein the data selection circuitry generates the third data group, when the number of reflection points at which the Doppler velocities are zero is smaller than a determined number.

6. The radar-installation-angle calculating device according to claim 1, wherein the data selection circuitry generates the third data group, when the number of reflection points is larger than or equal to a determined number.

7. The radar-installation-angle calculating device according to claim 1,
wherein when a plurality of reflection points having the same radar direction and the same Doppler velocity exists, the data selection circuitry generates, as the third data group, the reflection wave intensity and the Doppler velocity of a reflection point having a largest distance from the radar apparatus.

8. A radar apparatus mounted on a vehicle, comprising:
a radar-installation-angle calculating device that estimates an installation angle of the radar apparatus; and
determination circuitry that determines whether or not the estimated installation angle is displaced from a determined installation angle,
wherein the radar-installation-angle calculating device has:
radar data acquisition circuitry that generates a first data group and a second data group for each frame of a plurality of frames by using information regarding a velocity of the vehicle and a moving direction of the vehicle, the first data group indicating reflection wave intensities from reflection points with respect to radar directions and distances from the radar apparatus to the reflection points, the second data group indicating Doppler velocities of the reflection points with respect to the radar directions and the distances from the radar apparatus to the reflection points, and the radar directions indicating directions in which the corresponding reflection points exist relative to the radar apparatus;
data selection circuitry that generates a third data group by using the first data group and the second data group, the third data group indicating the reflection wave Intensities of the reflection points with respect to the radar directions and the Doppler velocities;
radar movement estimation circuitry that calculates a radar moving direction for each frame of a plurality of frames, based on the third data group, the radar moving direction indicating a moving direction of the radar apparatus relative to the moving direction of the vehicle; and
calculation circuitry that estimates the radar moving direction in a state in which the moving direction of the vehicle is straight ahead, by using the radar moving direction relative to the moving direction of the vehicle in a determined number of frames of the plurality of frames, and that calculates the radar installation angle by using the estimated radar moving direction.

9. A radar-installation-angle calculating method for a radar apparatus mounted on a vehicle, the method comprising:

generating a first data group and a second data group for each frame of a plurality of frames by using information regarding a velocity of the vehicle and a moving direction of the vehicle, the first data group indicating reflection wave intensities from reflection points with respect to radar directions and distances from the radar apparatus to the reflection points, the second data group indicating Doppler velocities of the reflection points with respect to the radar directions and the distances from the radar apparatus to the reflection points, and the radar directions indicating directions in which the corresponding reflection points exist relative to the radar apparatus;

generating a third data group by using the first data group and the second data group, the third data group indicating the reflection wave intensities of the reflection points with respect to the radar directions and the Doppler velocities;

calculating a radar moving direction for each frame, based on the third data group, the radar moving direction indicating a moving direction of the radar apparatus relative to the moving direction of the vehicle; and estimating the radar moving direction in a state in which the moving direction of the vehicle is straight ahead, by using the radar moving direction relative to the moving direction of the vehicle in a determined number of frames of the plurality of frames, and that calculates the radar installation angle by using the estimated radar moving direction.

* * * * *